US006816186B2

(12) United States Patent
Luke et al.

(10) Patent No.: US 6,816,186 B2
(45) Date of Patent: Nov. 9, 2004

(54) AUTOMATIC ZONE MONITORING

(75) Inventors: James Steven Luke, Fareham (GB); Christopher Edward Sharp, Winchester (GB); Andrew Gordon Neil Walter, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/484,096

(22) Filed: Jan. 18, 2000

(65) Prior Publication Data

US 2003/0020808 A1 Jan. 30, 2003

(30) Foreign Application Priority Data

Jul. 31, 1999 (GB) ................................................ 9917900

(51) Int. Cl.[7] .............................................. H04N 7/18
(52) U.S. Cl. ...................................................... 348/159
(58) Field of Search ................................ 348/143, 144, 348/145–159, 160, 169, 170; 382/107, 219; 345/473, 952; 364/188; H04N 7/18

(56) References Cited

U.S. PATENT DOCUMENTS

| | | | | |
|---|---|---|---|---|
| 4,777,526 A | * | 10/1988 | Saitoh et al. ................ 358/108 |
| 5,063,603 A | * | 11/1991 | Burt ............................. 382/115 |
| 5,627,915 A | * | 5/1997 | Rosser et al. ................ 382/219 |
| 5,724,493 A | * | 3/1998 | Hosoya et al. .............. 345/424 |
| 5,745,126 A | * | 4/1998 | Jain et al. .................... 345/952 |
| 5,764,786 A | * | 6/1998 | Kuwashima et al. ........ 382/107 |
| 5,774,357 A | * | 6/1998 | Hoffberg et al. ............ 364/188 |
| 5,831,669 A | * | 11/1998 | Adrain ......................... 348/143 |
| 6,081,606 A | * | 6/2000 | Hansen et al. .............. 382/107 |
| 6,239,833 B1 | * | 5/2001 | Ozaki et al. ................ 348/159 |
| 6,256,046 B1 | * | 7/2001 | Waters et al. ............... 345/473 |
| 6,396,535 B1 | * | 5/2002 | Waters ........................ 348/159 |
| 6,570,608 B1 | * | 5/2003 | Tserng ........................ 348/143 |

FOREIGN PATENT DOCUMENTS

| EP | 0 356 734 A3 | 3/1990 |
|---|---|---|
| EP | 0 577 491 A1 | 1/1994 |
| WO | WO 98/40855 | 9/1998 |

* cited by examiner

*Primary Examiner*—Tung T. Vo
(74) *Attorney, Agent, or Firm*—Thu Ann Dang; Ryan, Mason & Lewis, LLP

(57) ABSTRACT

A monitoring system using two or more cameras to monitor a space in 3 dimensions is disclosed. One or more virtual 3-D monitored volumes relating to dangerous or restricted areas, are constructed, preferably as CSG objects, within this space. By detecting an object moving within the view of the cameras, the system can determine if a moving object intersects any monitored volumes and take appropriate action.

13 Claims, 9 Drawing Sheets

AUTOMATIC ZONE MONITORING

FIELD OF INVENTION

The present invention relates to the development of an automatic zone monitoring system for use in the identification of zone infringements in applications such as security, health & safety, working practices analysis and traffic analysis.

BACKGROUND OF THE INVENTION

The use of video cameras in monitoring behaviour is increasing. In particular video cameras are now routinely used for security purposes and, whilst the majority of these systems are monitored manually, a number of systems have been developed to automatically analyze the resultant video feed. Much work has been done by the Universities of Leeds and Reading in the United Kingdom on the recognition and extraction of objects in video. The University of Leeds has developed algorithms to detect deformable objects, such as humans, using Hidden Markov Model techniques to help in the identification of pixel clusters as humans, and to predict their behaviour when information loss occurs, e.g. due to occlusion by foreground objects. The University of Reading has done research in the area of identifying rigid structures in video, such as vehicles, in a similar way.

In any case, both establishments have demonstrated the ability to identify objects by colour coding a bounding box around each object. See, for example, http://www.scs.leeds.ac.uk/imv/index.html.

Typically these security-systems involve static cameras monitoring regions in the view of a single camera. For example, anyone approaching a safe in a bank might trigger an alarm. These systems have no inherent understanding of the 3-D nature of the real world, so they cannot distinguish between a small object close to the camera and a large object far away. This is not a problem with applications which closely-monitor high-value/danger items which are not moving around.

In dynamic situations such as may be found in building sites for example, a single wide-angle camera may be covering a large zone, and 2-D aware systems may well trigger false alarms when, for eg, a crane lifts a load into the air, and visually the load (which may be close to the camera, and perfectly safe) might line-up with a more-distant object being monitored.

Surveillance systems which rely on manual analysis face a further problem in that they do not support the determination of more routine behavioral patterns and do not facilitate changes in the state of prohibited areas.

For example, in a health and safety application there may be regular occurrences of an employee passing through a danger area due to poor site design. Alternatively, the volume of the prohibited region may vary according to the state of dangerous equipment.

DISCLOSURE OF THE INVENTION

The present invention provides an automatic zone monitoring system comprising: means for capturing live video using a plurality of video cameras; and processing means connected to said video cameras comprising: means for automatically identifying moving objects within the field of view of said video cameras; means for defining one or more 3 dimensional monitored volumes; and means for detecting the intersection between said moving objects and the or each monitored volume.

BRIEF DESCRIPTION OF THE DRAWINGS

Embodiments of the invention will now be described with reference to the accompanying drawings in which.

DESCRIPTION OF THE PREFERRED EMBODIMENTS

The present invention provides a monitoring system using two or more cameras to monitor a space in 3 dimensions. One or more virtual 3-D monitored volumes, relating to dangerous or restricted areas, are constructed within this space. By detecting an object moving within the view of the cameras, the system can determine if a moving object intersects any monitored volumes and take appropriate action.

Figure 1:
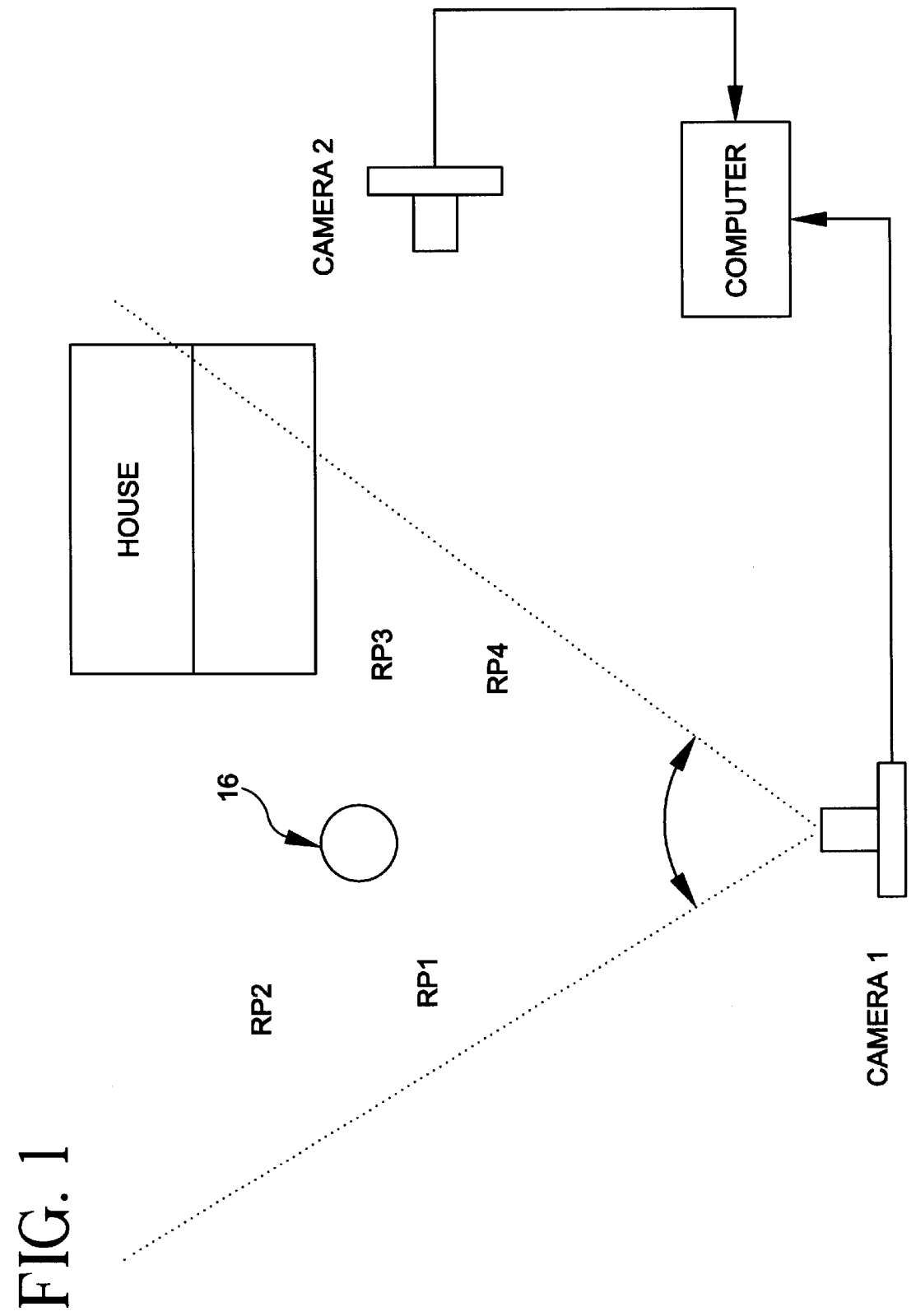
FIG. 1 is an aerial map of a building site.

Referring now to FIG. 1, a site including a house and a cement mixer is being monitored by Camera 1 and Camera 2. Images from the camera are fed back to a computer system where the images may be simultaneously displayed within respective windows on a computer display in a conventional manner. The connection between the cameras and the computer system may be by any conventional means ranging from simple direct cabling, through wireless RF or IR connections, to a network connection where the camera and the computer are connected typically via a TCP/IP link across a LAN, the Internet or an Intranet and in fact may be physically quite remote from one another.

The field of view for Camera 1, a wide angle camera with fixed focal length lens, is a cone radiating from the camera and appears as a triangle in the figure. Nonetheless, it is possible to use catadioptic lens cameras which capture 360 degree panoramas in a hemispherical space. The advantage of a catadioptic lens being wider coverage of a zone with less camera equipment. For more information on catadioptic lenses, see http://www.eecs.lehigh.edu/~tboult/VSAM/remote-reality.html.

Figure 2:
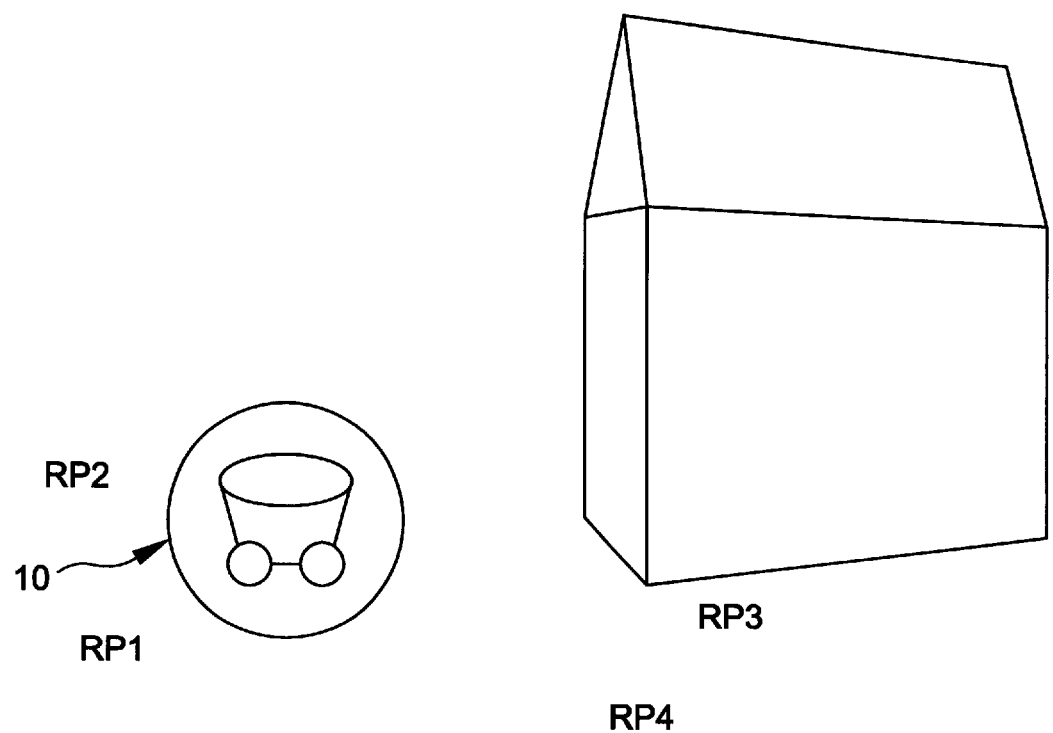
FIG. 2 is a view from camera 1 of FIG. 1 including a circle designating an object to be monitored.
Figure 3:
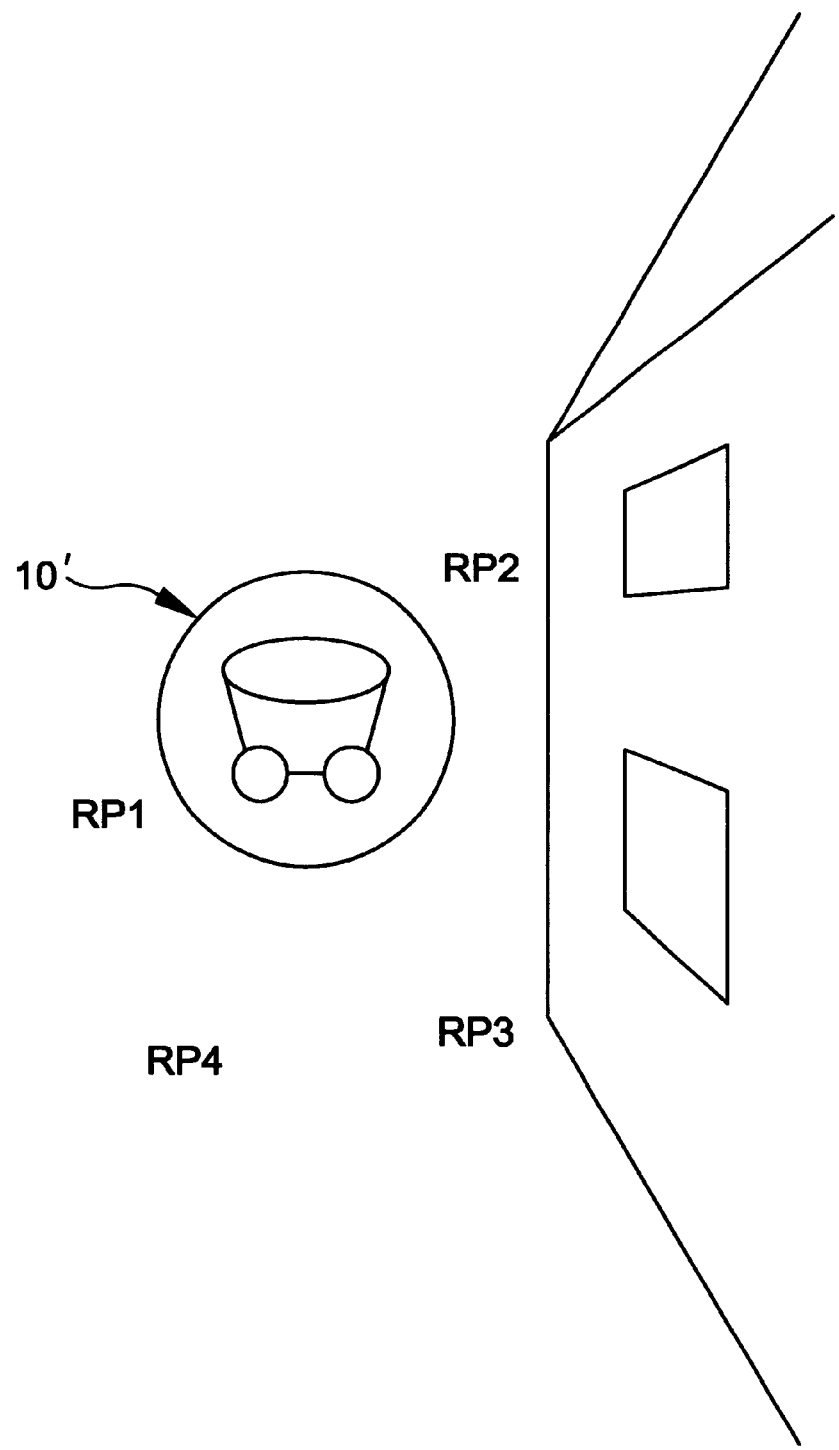
FIG. 3 is a view from camera 2 of FIG. 1.
Figure 4:
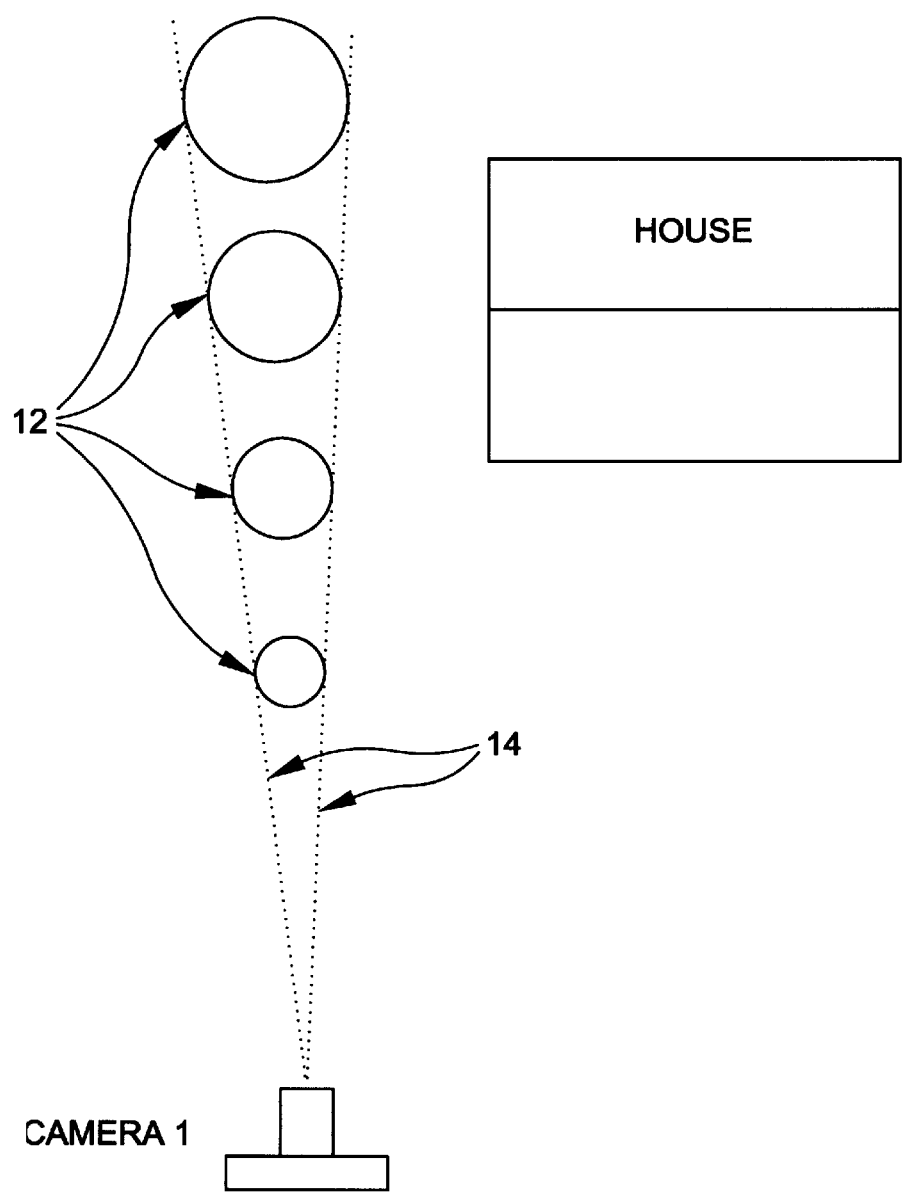
FIG. 4 illustrates the circle of FIG. 2 mapping to 3-D infinite cone.
Figure 5:
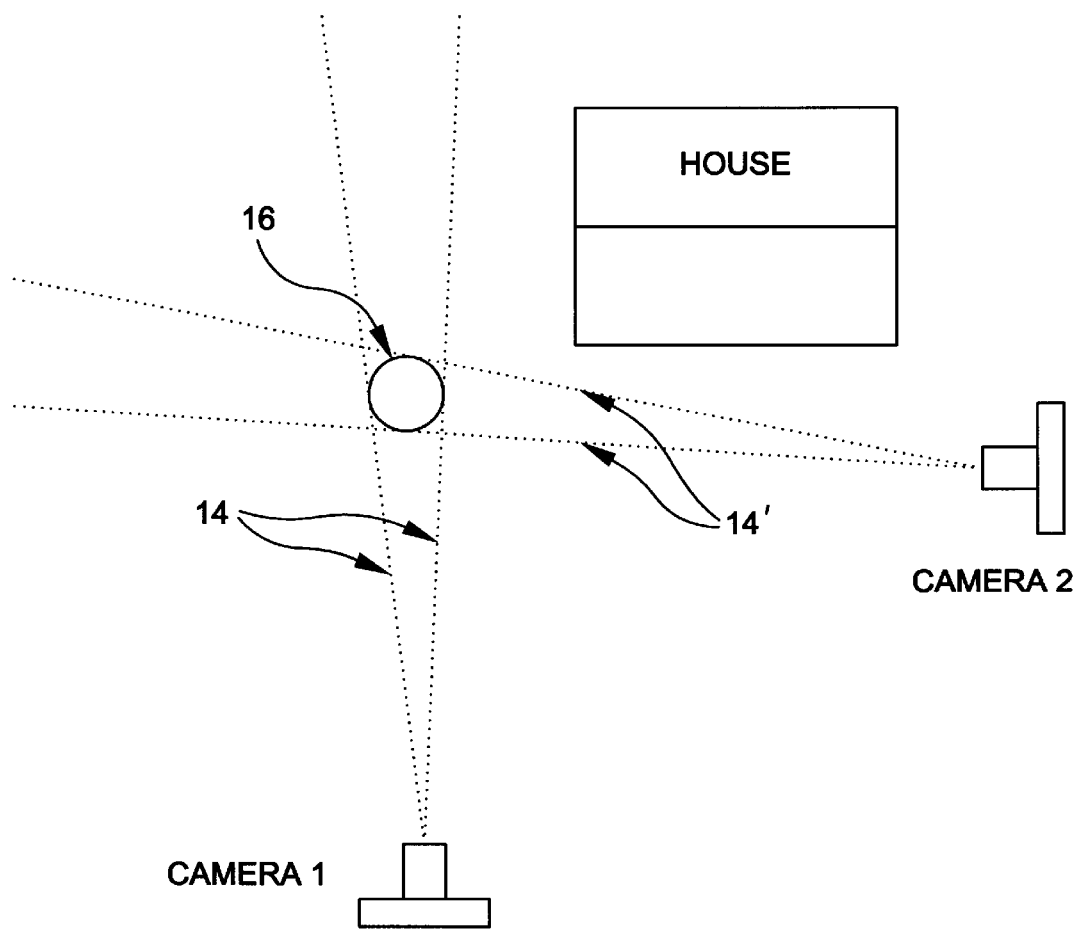
FIG. 5 illustrates the intersection of 2 danger cones to define a monitored volume.

In a first embodiment, a monitored volume 16 is defined by a user drawing a boundary around an object, eg a cement mixer, in at least two of the camera views in which the object appears. FIG. 2 shows a manually-selected circle 10 superimposed on the image for Camera 1. The 2-D circle 10 corresponds to an infinite cone 14 in 3-D, and an infinite number of possible spheres 12 can be located in the cone 14, FIG. 4. FIG. 3 shows the view from Camera 2 including a second circle 10' superimposed on the camera image and this in turn defines a cone 14' emanating from Camera 2. Finally, FIG. 5 shows the monitored volume 16 represented which is the intersection of the two cones 14, 14" corresponding to the circles 10, 10'. The boundaries 10, 10' in the various views are linked by allocating a common identifier to the boundaries eg Cement Mixer. It may be seen that the monitored volume 16, which represents a sphere around the mixer, is completely contained in the intersection-volume of the two cones 14, 14'. This monitored volume represents the best approximation to the desired spherical volume that can be achieved using only two camera-views.

It will be seen that boundaries such as the circles 10, 10' for the monitored volume 16 may be defined in any number of camera views. It is also not necessary, although it is desirable, for a monitored volume to be defined for every camera within whose field of view it lies. In the first embodiment, it is clear that if a boundary for a monitored volume is not defined in a camera view, then the result is that an object moving in that view will never cause a conflict with that volume, although a conflict may arise from camera views in which the monitored volume has been defined.

Figure 6:
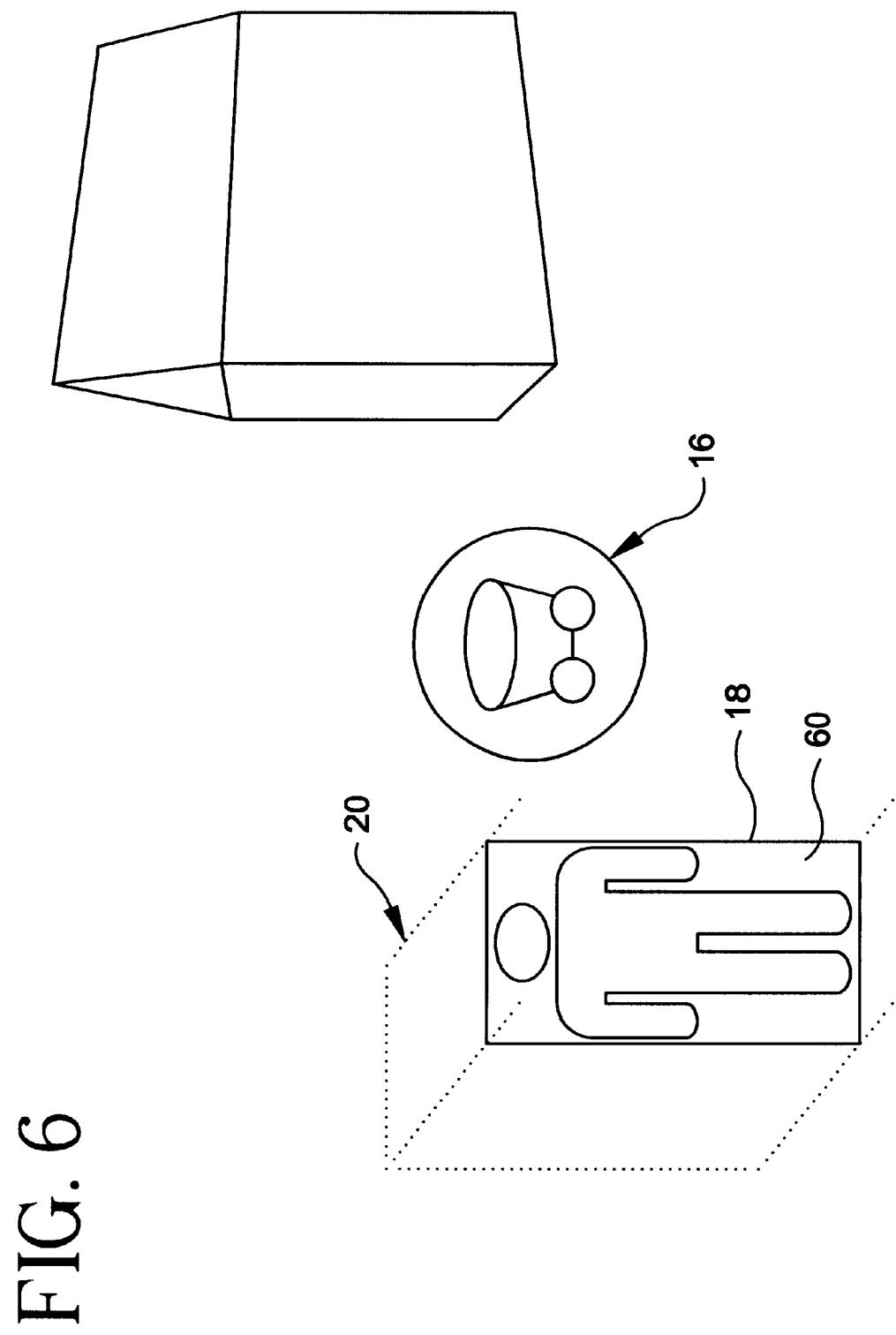
FIG. 6 shows a person, bounded by a box, appearing to approach the monitored volume of FIG. 5.
Figure 7:
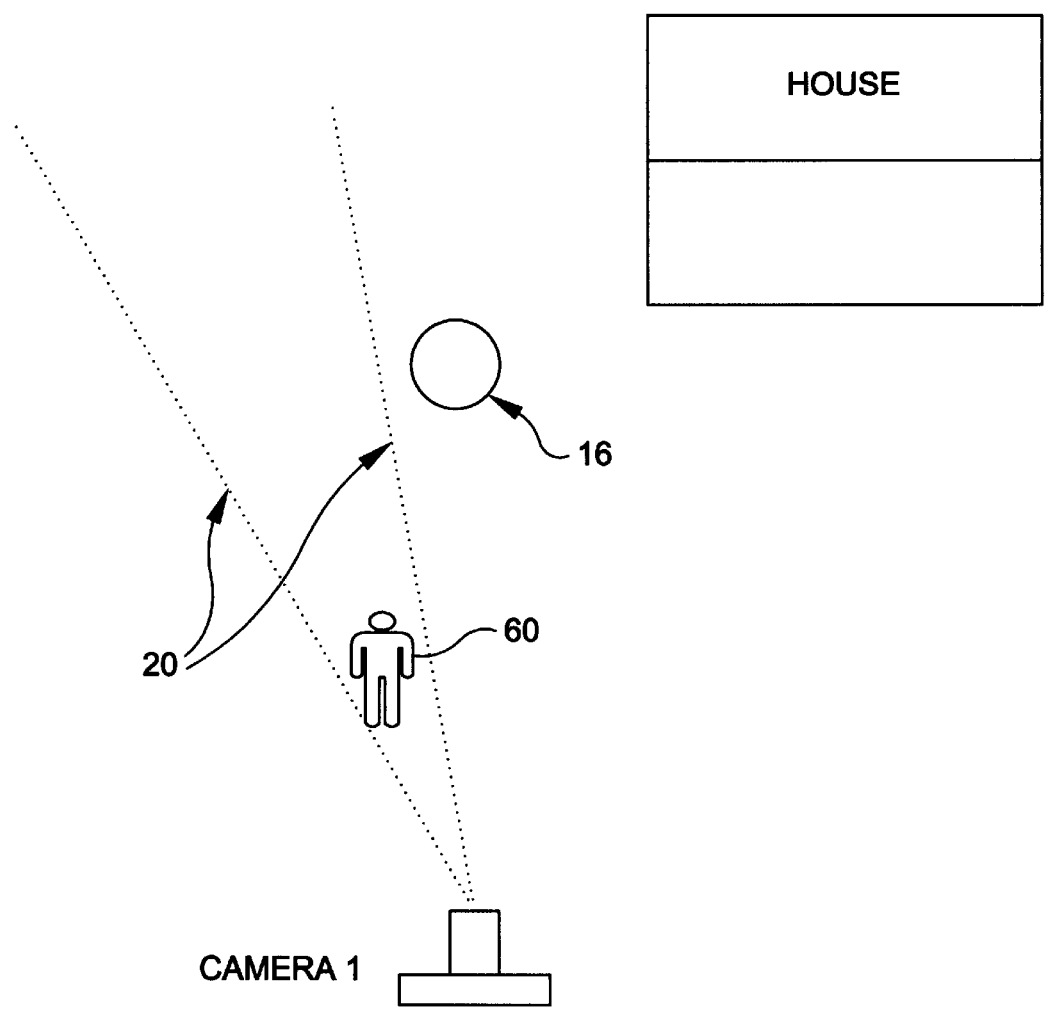
FIG. 7 shows an aerial view of a moving pyramid defined around the person of FIG. 6.

FIG. 6 shows a display where the computer has identified changing-pixels as a moving-object, in this case a person 60. In the manner disclosed by the Universities of Leeds and Reading, the system constructs a bounding box 18 around the moving pixels on detection of the set of moving pixels on the camera-image, and this corresponds to a rectangular moving pyramid 20 projected from the camera-viewpoint out into the 3-D real-world, FIG. 7.

Figure 8:
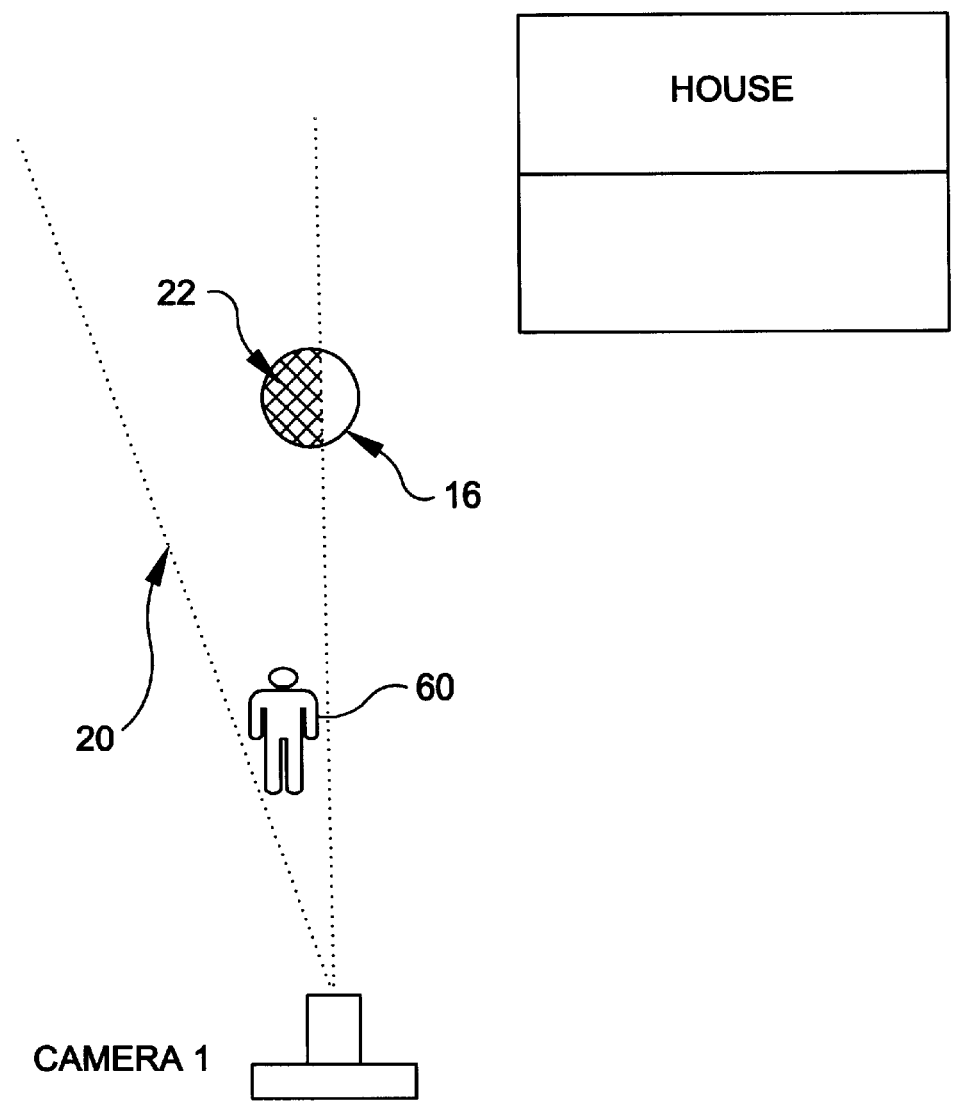
FIG. 8 shows an aerial view of a false-alarm due to a single-camera view.

When this rectangular-pyramid 20 intersects a 3-D monitored volume 16, i.e. when the bounding box 18 intersects the circle 10 in the camera image, an alarm condition may be set. It should be seen, however, that Camera 1 alone cannot determine where a person is located in the pyramid 20. FIG. 8 shows that if the person 60 moves to the right, the moving pyramid 20 appears to intersect the monitored volume 16 at hatched area 22. This shows that a system relying on Camera 1 on its own would consider that the person is in danger, and will trigger an alarm if it were the only decider. As such in 2-D systems, without employing complex heuristics, this would trigger a false-alarm. Thus, it is clear that using only a single camera is more likely to result in the generation of false-positives as the tracked object could exist at any position in the moving pyramid 20.

Figure 9:
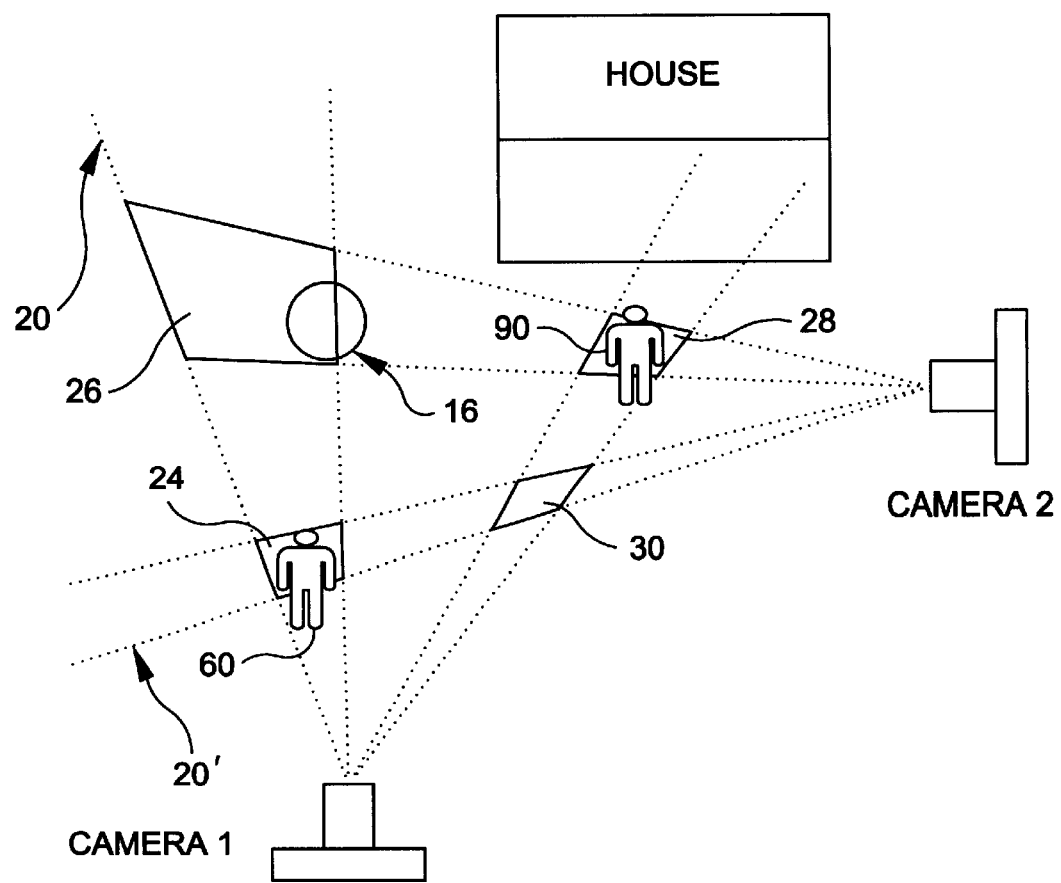
FIG. 9 shows a 3-D moving volume formed from the 2 views of cameras 1 and 2 of FIG. 1.

FIG. 9 shows a quadrilateral 24 constrained by moving pyramids 20 and 20' of Cameras 1 and 2 respectively. This intersection of 2 moving pyramids from 2 different cameras defines a constrained moving volume which locates the person accurately in 3-D. This new, smaller moving volume 24 does NOT intersect the monitored volume 16 of the cement mixer, so a false alarm is avoided.

It will be seen that a moving pyramid 20, 20' can be constructed using any 2-D closed shape to define its cross-section. Nonetheless, rectangular cross-sections have the advantage of computational simplicity. It should also be seen that the monitored volume 16 need not be a simple sphere, rather it can be a more complex shape defined by the intersection of pyramids projected from more complex boundaries 10, 10' defined in the camera views.

Nonetheless, it should be seen that in the first embodiment, the system checks for apparent boundary infringements using each camera independently of the other and raises an alarm if both cameras appear to show a moving object infringing the same identified monitored volume, for example, the "cement mixer". No correlation is made between the camera views and it is possible to incorrectly relate boundaries from one view to another, so causing the system to produce spurious results. Neither is it possible to relate moving objects from one camera view to another, and so again it is possible for the system to return false or spurious responses.

To enable simpler definition of even complex monitored volumes which are automatically usable in any camera view in which they are visible and to allow for greater resolution of possible false or spurious responses, a second embodiment is provided. In this embodiment, monitored volumes are constructed using Constructive Solid Geometry (CSG) techniques, where a monitored volume is defined as the CSG union/intersection/difference of primitive CSG objects, so allowing the construction of extremely complex shapes, if desired. CSG descriptions may be found at, for example, http://www.bath.ac.uk/~ensab/G_mod/FYGM/gm.htm. A monitored volume may thus take many different forms depending on the reason for its definition. For example, it may be defined as a parallelepiped surrounding a dangerous-place, eg a piece of machinery with revolving parts.

The second embodiment, however, requires a world coordinate system enabling CSG objects to be defined in such coordinates, rather than 2-D camera coordinates, so that monitored volumes may be defined and moving pyramids, also defined as CSG objects, may be checked for possible intersection with such monitored volumes.

The characteristics of each camera also need to be defined in world coordinates. Camera characteristics typically involve up to 8 unknowns:

the X,Y,Z coordinates of the origin of a camera viewpoint;

its geometry i.e. its focal length (possibly different in transverse directions for an asymmetric lens); and its alignment i.e. rotation about the X, Y and Z axes.

These characteristics can be determined in a conventional manner if the 3-D world coordinates of four non-coplanar reference-points RP1 . . . RP4 which appear within the field-of-view of a camera are known, FIG. 1. Alternatively, knowing the camera origin in 3-D, and the world coordinates of two reference-points in the field-of-view of the camera, similar techniques can be used to calculate the remaining camera geometry and alignment characteristics.

It should be seen that there is no need for the 3-D coordinates to be ultra-precise, because the system can be corrected to cope with small errors by manually adjusting the camera-characteristics/CSG coordinates until the predicted screen-position of the reference-points matches the actual on-screen position to pixel-accuracy.

The reference points can be beacons of a known shape or colour which are placed at locations of known coordinates and appear in each of the camera views to be automatically identified by conventional image processing techniques. For example, U.S. Pat. No. 5,579,471 discloses a system for querying images by content which could usefully be incorporated in the present invention. The beacons may even be adapted to emit infra-red light, perhaps even modulated, which can be detected by band-pass filtering the camera image to locate the camera image X,Y coordinates of the discrete infra-red sources.

Alternatively, the computer system can be adapted to allow a user to manually define the reference points simply by identifying a location of known coordinates in each of the camera views in which the location appears. Thus, the user could pick out one or more corners of the house as well as any other features at known locations in each of the camera views. In any case, it should be seen that once the camera has been characterised/calibrated, it doesn't matter if the real-world feature moves from the reference point, because the system should have already used the information to calibrate the camera.

It should be seen that the world coordinates need not be universal, where locations are taken for example from GPS systems, and in fact may be site based, where for example, the entrance to the site is the origin of the coordinate system and the units of the system are in metres rather than degrees of latitude and longitude. Nonetheless, any system based on this second embodiment will work as long as the camera characteristics, the moving pyramids and the monitored volumes are defined in the same coordinates.

In the present example, the reference points have world coordinates, as follows:

$$(X_{RP1}, Y_{RP1}, Z_{RP1}) \ldots (X_{RP4}, Y_{RP4}, Z_{RP4})$$

and corresponding camera image coordinates:

$$\text{Camera nn } ((x_{RP1}, y_{RP1}) \ldots (x_{RP4}, y_{RP4})).$$

This defines a mapping between world coordinates and the screen coordinates for each Camera nn.

Thus, it is possible to define 3-D virtual monitored volumes using the world coordinates, for example, Sphere (X=10, Y=50, Z=10) Radius=5; and knowing the 3-D coordinates of the monitored volumes, it is conventional to use the above mapping to project an image of a monitored volume onto the 2-D view of a camera, and so display the monitored volumes over a camera video image. This technique of overlaying virtual objects on a camera image is demonstrated by the Timeframe system deployed at the Ename archaeological site in Flanders, Belgium, where virtual drawings of the historical buildings are superimposed on images of the current site. It will be seen, however, that the Timeframe system was not designed for real-time detection of a moving object and assessment of the interaction of such an object with the virtual objects displayed on the single camera image.

Turning now to the definition of the moving pyramid objects 20, 20'. Knowing the screen coordinates of the rectangular bounding box 18, surrounding a moving object, the system is able to use the above mapping to define the world coordinates of a CSG rectangular pyramid object comprising four triangles emanating from the camera location, through respective adjacent vertices of the bounding box 18, FIG. 6.

Having constructed the moving pyramids 20, 20' as CSG objects and having one or more monitored volume objects 16, the system is now able to detect conflicts between the objects, providing each monitored volume 16 is in view of two (or more) cameras, by executing a CSG intersection calculation on the moving pyramids and monitored volumes. For non-null intersections, the system then assess the significance of those conflicts.

In one variation, CSG intersection of the monitored volume 16 and the union of all the moving pyramids 20 from the first camera is first used to determine Zone 1. Similarly, Zone 2 is constructed from the intersection of the same monitored volume 16, and all the moving pyramids 20' from Camera 2. When the intersection of two or more of these Zones are non-empty, the system has detected one (or more) instances of moving objects intersecting the monitored volume 16, hence a real conflict is assumed and an alarm condition is set.

In another variation, the system locates the set of intersections of moving pyramids emanating from the various cameras of the system. An intersection of this set of intersections and the monitored volumes is then used to determine if there are any conflicts.

Either technique eliminates the false-alarms that might be generated by 2-D systems.

In any case, a major advantage of the second embodiment is that it is not even necessary for a monitored volume visible in multiple views to be defined for all those views; the monitored volume can be constructed interactively using as little as two views and all the cameras that can see it will automatically monitor it.

The invention enables operators to configure a system for actions to be taken in response to different conflict scenarios, particularly where object state information is available either because the operator has input the information or it has been derived through some knowledge of the domain. For example:

if a conflict exists between a moving "vehicle" object and a "warning area object" monitored volume —record this conflict in a log file.

if a conflict exists between a moving "person" object and a "danger area object" monitored volume—record this in a log file and inform operator not to delete the camera tape (i.e. maintain for investigation).

if a conflict exists between a moving "person" object and a "prohibited area object" monitored volume—alert security.

It is important to appreciate that the significance of a conflict, and therefore the required detection accuracy, will vary between applications. For example in a security application any infringement may require the immediate real-time notification of an operator. Conversely in a health and safety application the system could be looking for repeated behavioral patterns which necessitate additional staff training or site redesign.

Naturally video surveillance systems are subject to physical constraints. For example, there may be regions in the surveillance area which are obscured from the view of the cameras. Furthermore the size of the surveillance area needs to be constrained such that a change in the scene, for example the movement of a person, registers as a significant pixel change.

It will also be seen that best results will be obtained if the various cameras of the system are not placed in substantially co-planar alignment with the objects being tracked/monitored. Referring to FIG. 9 in more detail, it will be seen that if Cameras 1 and 2 are co-planar with two objects, for example, the people 60, 90, moving within the cameras' field of view, then four volumes, shown bounded by the quadrilaterals 24, 26, 28 and 30, are defined by the intersection of the respectively moving pyramids emanating from Cameras 1 and 2. It is clear therefore, that it is possible for two of these volumes 26 and 30 to create false positives.

If cameras 1 and 2 are placed at "ground level" ie at similar heights to the people 60 and 90, then the two "false" volumes will also be substantially at "ground level", so allowing the possibility of intersecting monitored volumed which are also at "ground level". By raising or lowering the heights of the cameras, the heights of the "false positive" volumes can be made to lie above/below ground level, so reducing dramatically the chance of any intersection with a monitored volume.

This is because, without employing heuristics, no correlation is made between the moving objects in one camera view with those of another camera. Thus, the system has no idea whether the object 60 lies within the volume bounded by quadrilateral 24 or 26 or if the object 90 lies within the volume bounded by quadrilateral 28 or 30. Thus, the intersection of the volume bounded by quadrilateral 26 may also intersect the monitored volume 16 and so would create a false positive.

If on the other hand Camera 2 is placed above (higher in the Z-axis than) Camera 1, it will be seen that the moving pyramid emanating from Camera 2 and bounding the person 90 is less likely to intersect the moving pyramid 20 emanating from Camera 1 as it will pass under the pyramid 20. Similarly, the moving pyramid emanating from Camera 1 and bounding the person 90 will be less likely to intersect the moving pyramid 20' emanating from Camera 2 as it will pass under the pyramid 20'.

It will also be seen that best results will be obtained if the fields of view of the cameras are largely transverse. (This of course has no meaning in the case of catadioptic lens cameras.) This largely prevents two moving objects occluding each other in more than one camera view and thus causing the system to lose the benefits of the 3-D viewing provided by two or more cameras.

In spite of employing cameras in optimal positions, it is conceded that some ambiguities may still arise, especially where a number of objects are simultaneously moving within camera views.

Object tracking from frame to frame can help to mitigate such problems. Referring to FIG. 9, it will be seen that the moving pyramids 20, 20' will always intersect as they in fact relate to the same moving object. However, it is possible that from time to time, one of the pyramids 20, 20' will intersect a pyramid associated with another moving object. By noting the history of the intersection of the pyramids 20, 20' i.e. that they have always intersected, the system can relate the boundaries 18 and associate these with the same moving object. The system can therefore discount an intersection volume associated with another object and eliminate what may have been a false positive.

Because in the second embodiment, the system knows the 3-D location of the intersection of related moving pyramids relating to the same moving object, object tracking can also be used to prevent accidents or security breaches, because the system can attempt to predict the possible destination of a moving object or draw interference from the pattern of movement of an object, eg if an object seems to be moving from car to car in a car park, where cars are defined as the monitored objects, the system may decide this could be a thief and alert security; or if an object is moving towards a monitored volume an audible warning may sound deterring the object from moving closer.

Now that the preferred embodiments have been described, it will be seen that many possible enhancements to the system are possible, including:

the use of object state information in the construction of the 3-D objects. As well as the examples above, the position and operating parameters of a crane could be automatically fed to the system and used to determine the size and position of a monitored volume. In the same way that reference-points were used to calculate the camera-geometry earlier, the same method may be used to determine the position and size of moving objects, by triangulation using two or more views of the said object, to which may be attached a self-identifying beacon. Alternatively, in a security application, monitored volumes designated as prohibited zones could vary depending on the time of day or working hours.

the inclusion of a predictive capability to enable the construction of "what if" scenarios. For example, in developing a security plan an operator could use the system to consider where a moving subject could move to in a specified time at a specified speed.

improvement in the conflict determination algorithms through the inclusion of background knowledge in the system. The provision of a 3-D model of the zone being monitored, constructed either interactively on-site or generated automatically from site schematics, enables an improvement in the conflict determination algorithms. For example, by including information on the location of site boundaries it is possible to constrain moving pyramids 20, 20' to a finite range between the boundary and the camera. Similarly, it is possible to include information relating to the dynamics of vehicles and people moving through the site. It is also possible to apply CSG techniques to constrain the geometric volume of such moving pyramids, for eg a solid wall in the field of view of a camera restricts the view beyond it; in CSG terms this means a new bounding-volume can be constructed to extend beyond the wall, which restricts the operating-volume of the moving-pyramid to lie in front of the wall, or to one side or above it, but not behind it. The 3D volumes to be monitored by the cameras are effectively clipped, which will again help to reduce false positives.

the use of "intelligent" determination, for example identifying whether a moving object is a person or a vehicle, enables more appropriate alert generation. For example, a bull-dozer approaching a cement mixer might be considered "safe", whereas a person in the same place might be considered "at risk".

It will be seen from the foregoing description that the computer system need not be a single computer and its processing capabilities can be distributed or implemented according to the economics of the zone to be monitored. For example, it may be possible to incorporate the processing means required to locate and create a boundary around a moving object within the video camera and to only transmit the video image to the computer when there is a moving object, thus reducing the required bandwidth and processing overhead on the computer. The means for defining and displaying monitored volumes may also be separated from the means for monitoring a site from day to day, so enabling the monitoring means to be implemented as a dedicated component without needing peripherals such as a display or keyboard.

Finally, the embodiment has been described using object oriented terms. It should be seen, however, that the invention is not limited to a strict implementation in object oriented languages and may be implemented using any suitable programming techniques.

It should be seen that in the present specification, the term "pyramid" has been used to define an object having any shaped based with vertices extending from an apex. The shape of the base may include any combination of lines and curves. Such shapes include triangles, quadrilaterals, circles, ellipses, combinations of these, but are not limited to simple closed areas. As such the term pyramid should be construed to include a conical shape. Complex areas including holes are permitted, so for example the mixer may be protected by an annular-cone (formed by the projection into 3-D of a doughnut or ring), such that the rotating portion of the mixer in the very middle may itself be identified as a "moving object", but will not trigger an alarm as it does not intersect the monitored-pyramid extending around (but not touching) it.

What is claimed is:

1. An automatic zone monitoring system comprising:
   means for capturing live video substantially simultaneously from a plurality of video cameras; and
   processing means connected to said video cameras comprising:
       means for automatically identifying moving objects within a field of view of at least two of said video cameras;

means for defining one or more three-dimensional monitored volumes; and means for detecting an intersection between said moving objects and the one or more monitored volumes.

2. An automatic zone monitoring system according to claim 1 wherein said defining means comprises means for defining a plurality of monitored boundaries within the field of view of two or more of said video cameras, and means for relating monitored boundaries associated with the same monitored volume, said monitored volume being the intersection of respective pyramids projected through related monitored boundaries from the viewpoint of a camera associated with said monitored boundary.

3. An automatic zone monitoring system according to claim 2 wherein said identifying means comprises means for defining a boundary around said objects moving within the field of view of said video cameras; and said detecting means comprises means for detecting the intersection of said moving object boundaries and any monitored boundaries defined for said video cameras.

4. An automatic zone monitoring system according to claim 3 comprising warning means responsive to moving object boundaries intersecting at least two related monitored boundaries to raise an alarm.

5. An automatic zone monitoring system according to claim 1 wherein said processing means comprises:

means for generating a correlation between the respective fields of view of said video cameras with the 3-dimensional coordinates of the zone being monitored; and wherein said defining means comprises means for defining the one or more monitored volumes in terms of said 3-dimensional coordinates;

said identifying means comprises means for defining a boundary around said objects moving within the field of view of said video cameras; and said detecting means comprises means for defining respective moving pyramids projected through moving object boundaries from the viewpoint of a camera associated with said boundary in terms of said 3-dimensional coordinates; and means for generating the intersection of the one or more monitored volumes with the intersection of said moving pyramids.

6. An automatic zone monitoring system as claimed in claim 5 wherein said detecting means comprises means for tracking the intersection of respective moving pyramids and means for relating moving pyramids associated with the same moving object according to the track of the intersection of said moving pyramids, said generating means being adapted to generate an intersection of the set of intersections of related moving pyramids and the one or more monitored volumes.

7. An automatic zone monitoring system according to claim 6 comprising warning means responsive to said intersection being non-null to raise an alarm.

8. An automatic zone monitoring system as claimed in claim 7 comprising means for associating attributes with each moving object, said warning means being responsive to the attributes of a moving object within said intersection to determine the type of alarm to be raised.

9. An automatic zone monitoring system as claimed in claim 1 wherein at least two of said cameras are placed in transverse alignment.

10. An automatic zone monitoring system as claimed in claim 1 wherein at least two of said cameras are placed on planes non-aligned with said moving objects.

11. An automatic zone monitoring system as claimed in claim 1 comprising display means connected to said processor means, said processor means being adapted to display live video from said video cameras, and to superimpose on said respective live video displays, said monitored volumes.

12. A method of automatically monitoring a zone comprising the steps of:

capturing live video substantially simultaneously from a plurality of video cameras;

automatically identifying moving objects within a field of view of at least two of said video cameras;

defining one or more three-dimensional monitored volumes; and detecting an intersection between said moving objects and the one or more monitored volumes.

13. A computer program product comprising computer program code stored on a computer readable storage medium for, when executed on a computing device, automatically monitoring a zone, the program code comprising means for performing the steps of claim 12.

* * * * *